(12) United States Patent
Alger et al.

(10) Patent No.: US 11,156,181 B1
(45) Date of Patent: Oct. 26, 2021

(54) MULTIPLE MODE OPERATION OF HYDROGEN-FUELED INTERNAL COMBUSTION ENGINE

(71) Applicant: Southwest Research Institute, San Antonio, TX (US)

(72) Inventors: Terrance Francis Alger, San Antonio, TX (US); Thomas E. Briggs, Jr., Helotes, TX (US); Graham Thomas Conway, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 17/327,391

(22) Filed: May 21, 2021

(51) Int. Cl.
*G06F 19/00* (2018.01)
*F02D 41/18* (2006.01)
*F02D 41/00* (2006.01)
*F02D 35/02* (2006.01)
*F02B 11/00* (2006.01)

(52) U.S. Cl.
CPC ............ *F02D 41/182* (2013.01); *F02B 11/00* (2013.01); *F02D 35/023* (2013.01); *F02D 35/027* (2013.01); *F02D 41/0027* (2013.01); *F02D 2200/1002* (2013.01)

(58) Field of Classification Search
CPC ... B60W 2030/206; B60W 2510/0638; B60W 2510/0652; B60W 2710/0644; B60W 2710/0661; F02D 31/007; F02D 41/1498; F02D 41/40; F02D 41/401

USPC ......... 701/101, 103–105, 110; 123/299, 300, 123/429–431, 434, 436, 676, 681, 687
See application file for complete search history.

(56) References Cited

U.S. PATENT DOCUMENTS

| | | | |
|---|---|---|---|
| 6,912,992 B2 * | 7/2005 | Ancimer | F02D 41/3047 123/299 |
| 2001/0022168 A1 * | 9/2001 | Teraji | F02B 1/12 123/295 |
| 2002/0078918 A1 * | 6/2002 | Ancimer | F02B 23/0672 123/295 |
| 2003/0070650 A1 * | 4/2003 | Ishikawa | F02D 41/403 123/299 |
| 2016/0076466 A1 * | 3/2016 | Moore | F02D 41/024 60/273 |

* cited by examiner

*Primary Examiner* — John Kwon
(74) *Attorney, Agent, or Firm* — Livingston Law Firm

(57) ABSTRACT

A method of operating a hydrogen-fueled internal combustion engine. The engine is determined to have a mode control value, which represents a threshold torque. During operation of the engine, a demanded torque of the internal combustion engine is determined and compared to the threshold torque. If the demanded torque is less than the threshold torque, the engine is operated in a low load mode that uses spark ignition and pre-mixed combustion. If the demanded torque is greater than the threshold torque, the engine is operated in a high load mode that uses compression ignition and diffusion combustion.

18 Claims, 5 Drawing Sheets

MULTIPLE MODE OPERATION OF HYDROGEN-FUELED INTERNAL COMBUSTION ENGINE

TECHNICAL FIELD OF THE INVENTION

This patent application relates to internal combustion engines, and more particularly to hydrogen-fueled internal combustion engines.

BACKGROUND OF THE INVENTION

Interest in hydrogen-fueled internal combustion engines is increasing, with part of the motivation being to meet polluting emission goals. These engines offer a pathway for near-zero greenhouse gas emissions.

Hydrogen fueling offers many benefits for internal combustion engines. The ignition energy of hydrogen is an order of magnitude lower than that of gasoline. This low ignition energy makes hydrogen easy to ignite, even under extremely dilute conditions such as with recirculated exhaust or lean combustion. The flame speed of hydrogen is about four to five times faster than that of gasoline, which improves efficiency through improved combustion phasing relative to piston motion. Hydrogen has a small quenching distance (about three times less than gasoline), reducing unburned fuel emissions and improving combustion efficiency (although it does increase heat transfer losses from the combustion chamber). Finally, hydrogen has a high research octane number (RON), which makes it resistant to end-gas autoignition and subsequent knock.

However, using hydrogen as a fuel also presents challenges. The main challenges are high heat transfer due to an increase in combustion temperature and uncontrolled pre-ignition of the fuel due to hot spots in the combustion chamber. The low ignition energy of hydrogen compared to gasoline reduces the temperature threshold to where a localized hot spot in the combustion chamber can cause pre-ignition of an unburned hydrogen-air mixture. As engine load and speed increase, the propensity for pre-ignition to occur also increases.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to methods for enabling hydrogen to fuel an internal combustion engine at both low and high power (load) engine operating conditions. The engine has one mode for low loads and another mode for high loads. In one embodiment, at lower loads, pre-mixed spark-ignited combustion is used. At higher loads, late-injection hydrogen with compression ignition is used.

As discussed in the Background, pre-ignition is a challenge with hydrogen fuel in spark-ignited internal combustion engines. One solution is to not use pre-mixed spark-ignited combustion, but rather to use compression ignition and inject the hydrogen later in the engine cycle. This eliminates the problem of hot-spot pre-ignition at higher loads. However, at lower loads the in-cylinder temperature is too low for compression ignition to occur.

One solution for assisting compression ignition with hydrogen fuel is a glow plug, which creates a high-temperature zone to initiate combustion. However, a glow plug approach may be problematic at higher loads or during transients. Under these engine conditions, reliance on a hot spot for ignition may prevent proper control of ignition timing.

Figure 1:
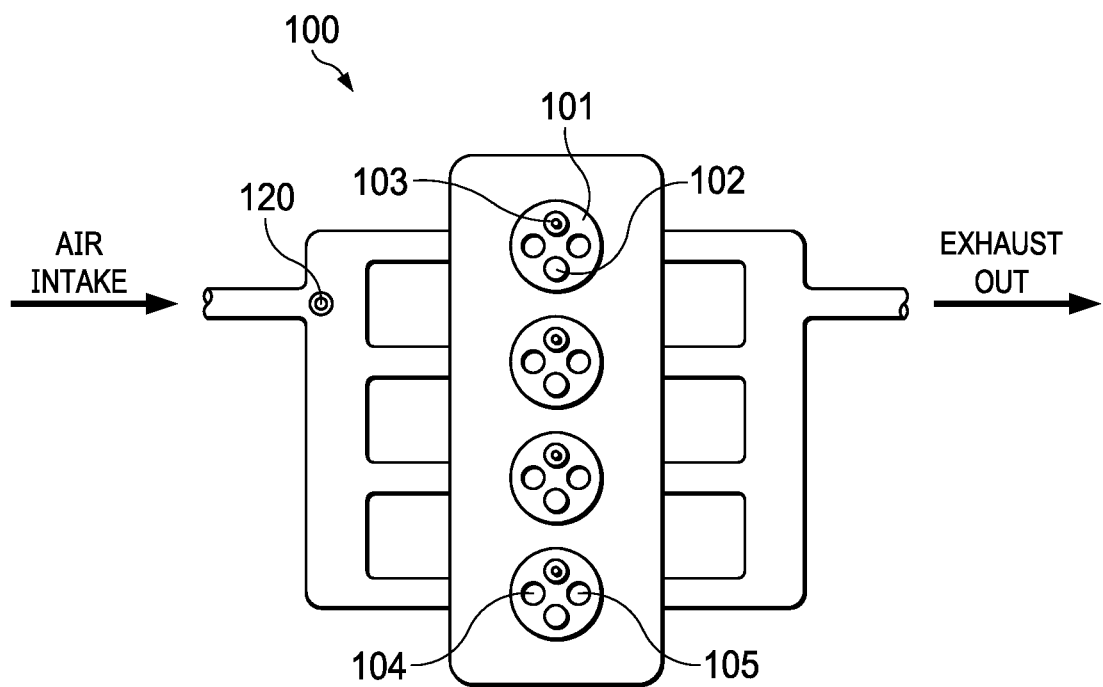
FIG. 1 illustrates a hydrogen-fueled internal combustion engine in accordance with the invention.
Figure 1:
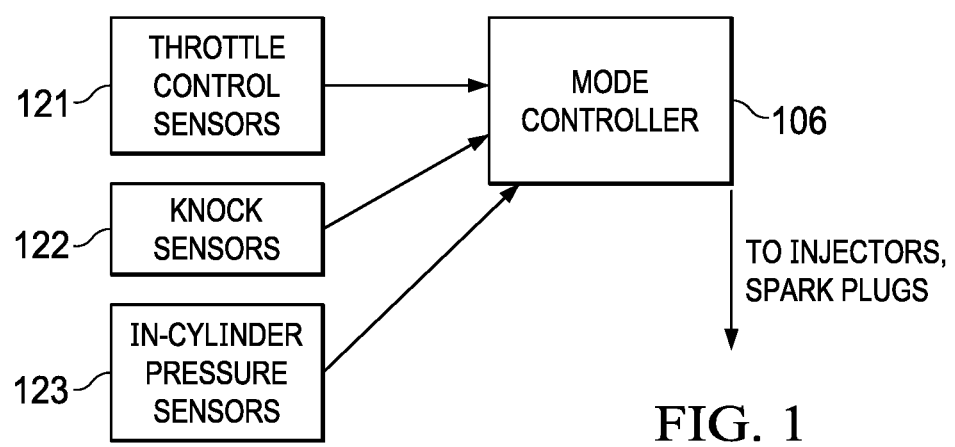

FIG. 1 illustrates a hydrogen-fueled internal combustion engine 100 in accordance with the invention. Although engine 100 is shown with a crankshaft such as is used with an automotive vehicle engine, engine 100 may be any one of various engine platforms, stationary or mobile, including without limitation vehicles, machinery, ships, and locomotives.

Engine 100 has a number of cylinders 101, each with at least one hydrogen fuel injector 102 and at least one spark plug 103. As explained below, each cylinder's injector and spark plug are co-located at the top of the cylinder head.

Each cylinder 101 is further equipped with at least one air intake valve and at least one exhaust valve (represented as ports 104 and 105 respectively), which operate as is typical in a two-stroke or four-stroke internal combustion engine.

A controller 106 implements a multi-mode operation of engine 100. Specifically, the engine 100 is operated with two combustion modes, one for low loads and one for high loads. It is assumed that controller 106 has appropriate hardware and software for performing the tasks described herein.

The mode control implemented by controller 106 is torque-based. Thus, through modeling or experimentation, a torque value is determined to be a threshold, below which the engine 100 will operate in low load mode and above which engine 100 will operate in high load mode.

During engine operation, this threshold mode control value is compared to a torque value. The torque value may be measured from an intake airflow sensors 120 and/or throttle control sensors 121. For example, in an automobile engine the throttle control sensor would measure the accelerator pedal position. Typically, the torque value will be a demanded torque value represented the torque currently being demanded by the operator.

One or more secondary inputs for mode control may also be used. One secondary input is from knock sensors 122. Another secondary input is in-cylinder pressure sensors 123.

Having determined whether engine 100 is in a low load or high load operating condition, controller 106 delivers control signals to injectors 102 and spark plugs 103 to operate in the manner required for the current engine mode.

The following figures illustrate various modes of operation of a hydrogen-fueled internal combustion engine, such as engine 100. The engine is represented as a single cylinder 101, but it should be understood that for a given mode, all engine cylinders are operated in the same manner.

Figure 2A:
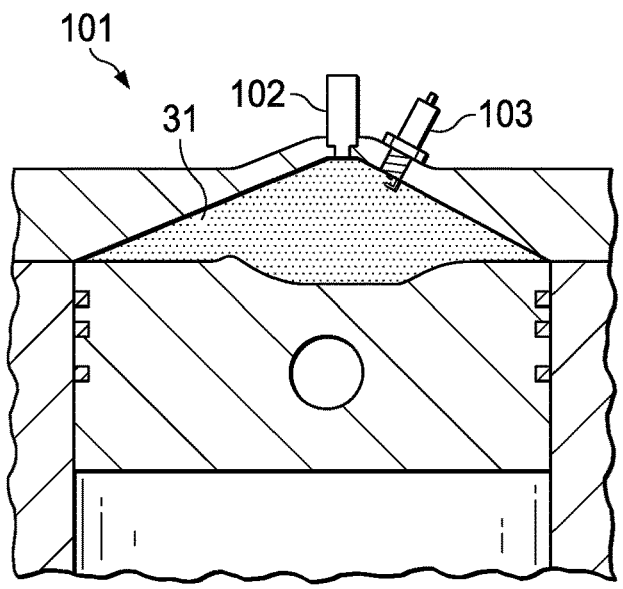
FIGS. 2A-2C illustrate a low load mode for operating the engine.

For all modes, and using FIG. 2A for explanation, a cut-away view of the top portion of an engine cylinder 101 is shown. The shape of the combustion chamber 31 and the relative location of the fuel injector 102 and spark plug 103 are important. The injector 102 is centrally mounted at the top center of the combustion chamber 31. The spark plug 103 is co-located with the injector 102.

The gap of the spark plug 103 is located such that it falls between two of the injector's spray plumes (if the injector is multi-hole) or on the periphery of the plume (if the injector has a single hole).

Due to turbulence, the boundary layer of the spray is not a consistent shape, so the ignition event is of fairly long spark duration to account for the variability in the equivalence ratio of the mixture in the gap of the spark plug with time. The final relative positions of the injector 102 and spark plug 103 will be a function of engine displacement, injection design pressure, target maximum load and rated engine speed.

Figure 2B:
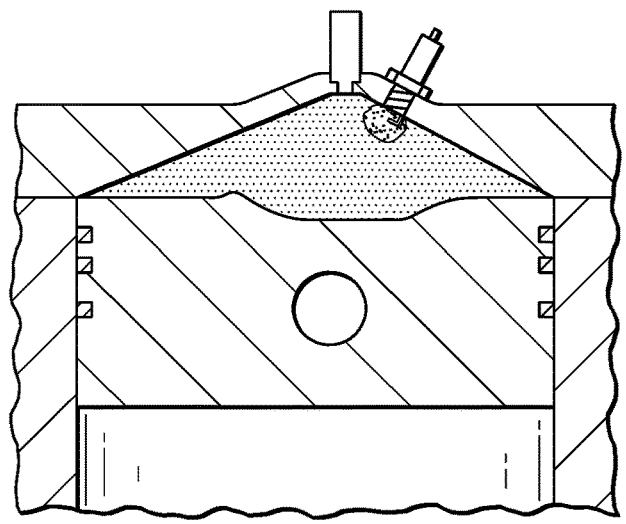
Figure 2C:
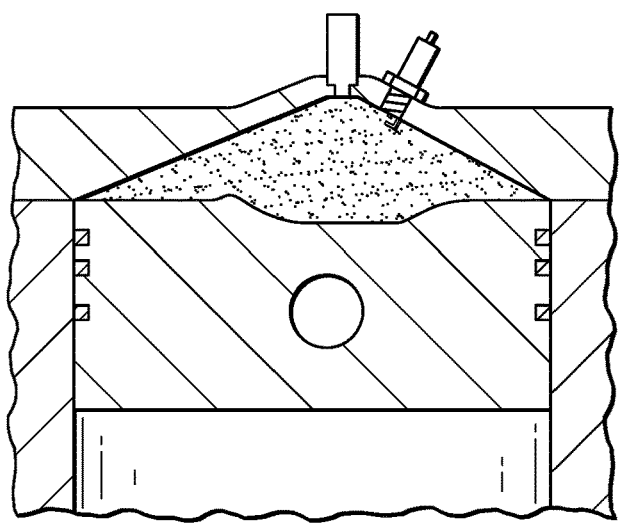

FIGS. 2A-2C illustrate a first embodiment of operating a hydrogen-fueled engine at low loads. This method is a pre-mixed (homogenous or stratified) spark-ignited combustion. By "pre-mixed combustion" is meant that the combustion oxidizer (air) and hydrogen are mixed prior to the ignition flame event. The pre-mixing may be as a result of both air and fuel being received into the combustion chamber during an intake stroke of the cylinder piston. Or the air-fuel could be pre-mixed by injecting hydrogen after the intake valves have closed using a direct injection system.

Hydrogen fuel is injected into the combustion chamber 31 via fuel injector 102 in the vicinity of top dead center. A spark plug 103 is required to ignite the mixture.

Figure 3A:
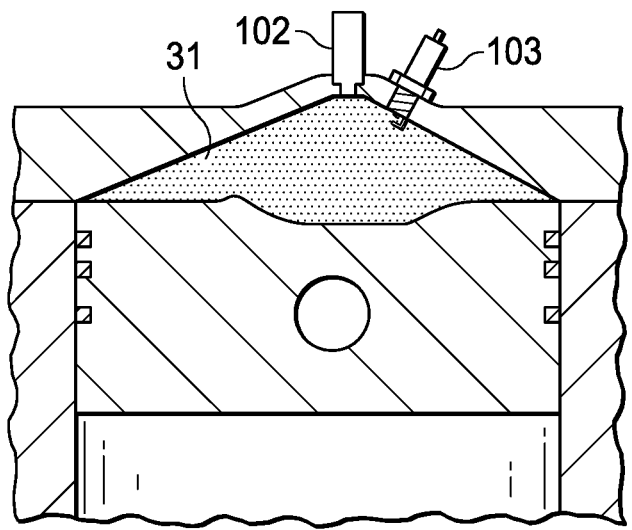
FIGS. 3A-3C illustrate an alternative embodiment of the low load mode.
Figure 3B:
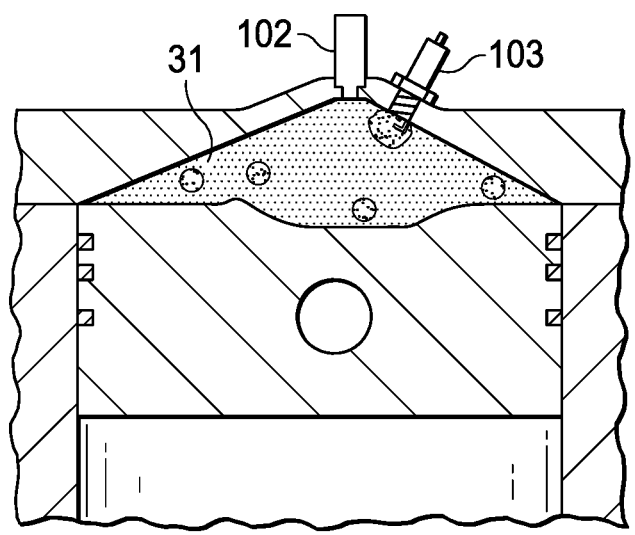
Figure 3C:
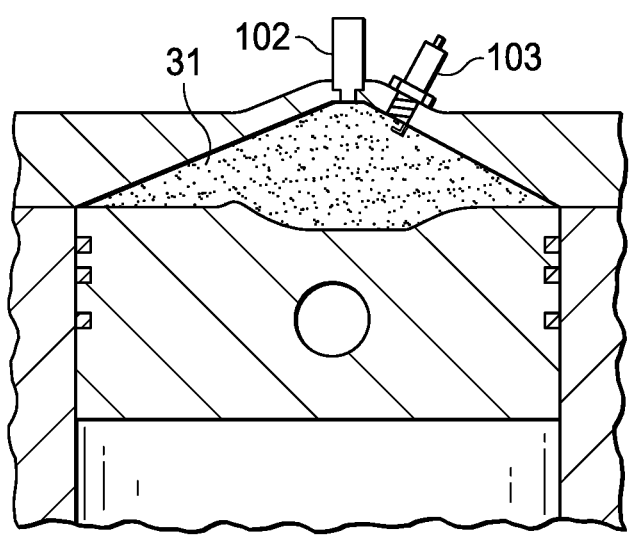

FIGS. 3A-3C illustrate a variation of the low load mode. This mode is a spark-assisted compression ignition mode. The combustion is "diffusion combustion", where air and fuel mix while the combustion event occurs rather than prior to the ignition event.

In FIG. 3A as in FIG. 2A, hydrogen fuel is injected into the combustion chamber 31 via a fuel injector 102 in the vicinity of top dead center. The injected fuel spray is all fuel at its core and transitions to all air at its periphery. The fuel and air are diffusing and spark plug 103 ignites the propagating flame where the mixture is correct for combustion. The flame itself results in auto-ignition of the end-gas in a temporally controlled event.

Figure 4A:
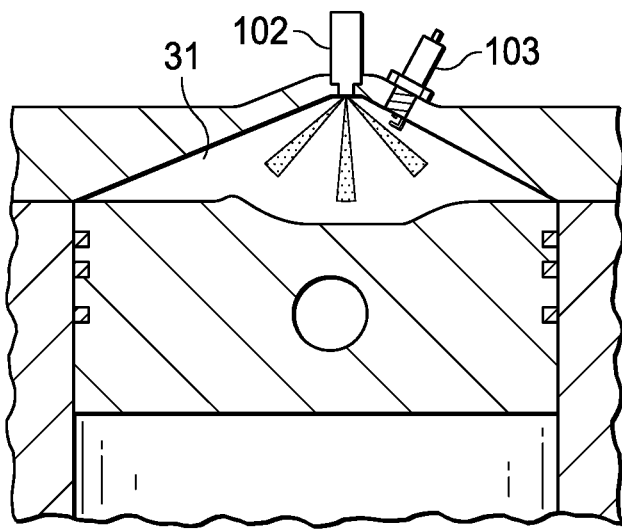
FIGS. 4A-4C illustrate a high load mode for operating the engine.
Figure 4B:
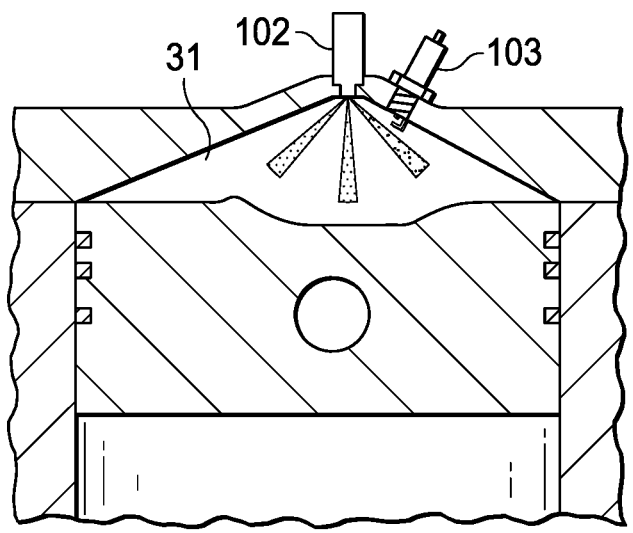
Figure 4C:
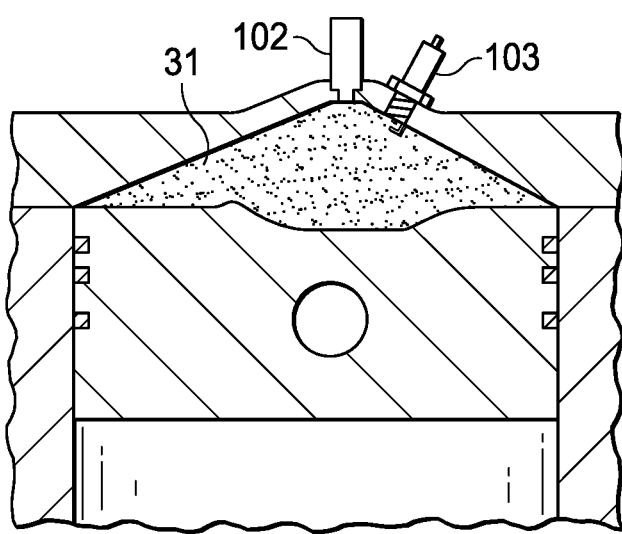

FIGS. 4A-4C illustrate a first embodiment of operating the hydrogen-fueled engine 100 at high loads. At higher loads, spark plug 103 is switched off. Spark plug 103 is a cold heat rating spark plug to avoid the possibility of the spark plug itself becoming a hot spot. The combustion of FIGS. 4A-4C is diffusion combustion, where the injected hydrogen ignites due to the compression heating upon the cylinder contents.

Figure 5A:
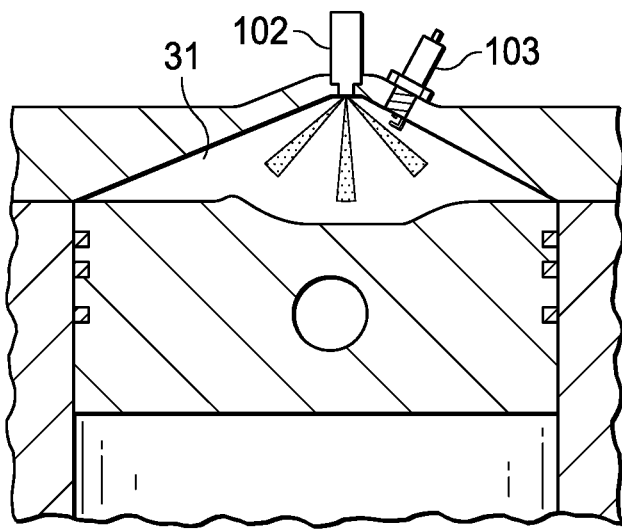
FIGS. 5A-5C illustrate an alternative embodiment of the high load mode.
Figure 5B:
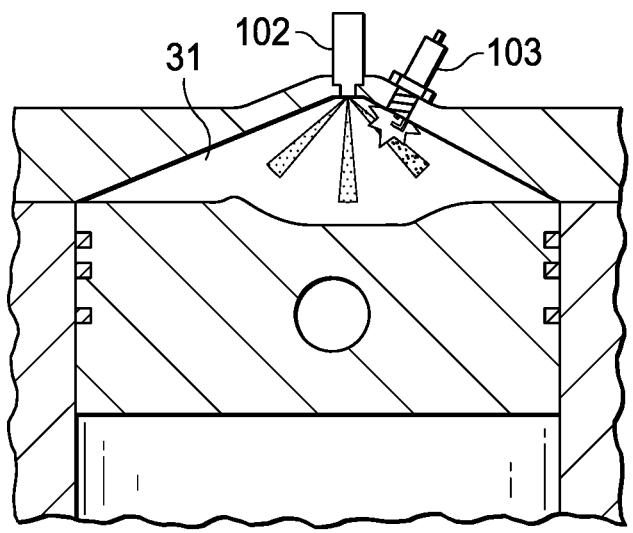
Figure 5C:
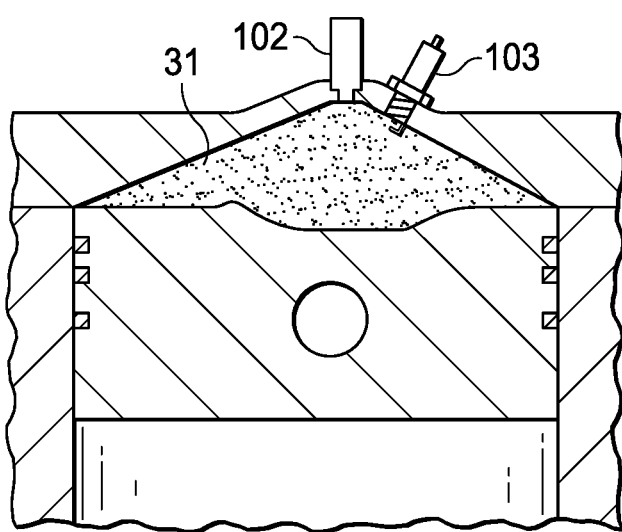

FIGS. 5A-5C illustrate a variation of the high load mode. Spark plug 103 is fired to ignite either a small pilot injection of hydrogen that raises the cylinder temperature to a point that allows for autoignition of the main hydrogen injection event, or to ignite one of the spray plumes of a hydrogen injection event which then raises the temperature enough to ignite the remaining spray plumes via thermal means.

In third variation of the high load mode, a small amount of hydrogen is injected into the main combustion chamber 31 before the main hydrogen injection event. This pre-injected hydrogen-air mixture is below the lean flammability limit and thus does not pre-ignite. This premixed fuel burns in a lean propagating flame once the main diffusion flame began. Generally, this leads to lower NOx emissions from combustion due to the lean conditions for the premixed fuel.

In modes where spark ignition is used, multiple ignition events could be used. These ignition events could either be re-strikes or extension of the spark event using a high energy ignition system. This re-strike event may be required to continue to burn hydrogen as a diffusion flame at the high load conditions.

Multiple injections of hydrogen could be used to develop the proper concentration profile in the engine. This could stratify the hydrogen-air mixture to minimize H2 leakage past piston rings into the engine crankcase and to reduce interaction of the flame with the cylinder walls (both for reduced heat transfer losses and to minimize the risk of hot-spot pre-ignition).

What is claimed is:

1. A method of operating a hydrogen-fueled internal combustion engine, the engine having at least one cylinder, comprising:
   determining a mode threshold value, the mode threshold value representing a torque of the internal combustion engine;
   during operation of the internal combustion engine, determining a demanded torque of the internal combustion engine;
   comparing the demanded torque to the mode threshold value;
   if the demanded torque is less than the mode threshold value, operating the internal combustion engine in a low load mode;
   wherein the low load mode uses spark ignition and pre-mixed combustion;
   if the demanded torque is greater than the mode threshold value, operating the internal combustion engine in a high load mode;
   wherein the high load mode uses compression ignition and diffusion combustion.

2. The method of claim 1, wherein the step of determining a demanded torque is performed at least in part by using an intake airflow sensor.

3. The method of claim 1, wherein the step of determining a demanded torque is performed at least in part by using a torque control sensor.

4. The method of claim 1, wherein the step of determining a demanded torque is performed at least in part by using a knock sensor.

5. The method of claim 1, wherein the step of determining a demanded torque is performed at least in part by using an in-cylinder pressure sensor.

6. The method of claim 1, wherein the engine has a fuel injector centrally mounted at the head of the cylinder and a co-located spark plug.

7. The method of claim 1, wherein the fuel injector is a multi-hole injector, and the spark plug has a gap between two of the injector's spray plumes.

8. The method of claim 1, wherein the fuel injector is a single-hole injector, and the spark plug has a gap on the periphery of a plume produced by the injector.

9. The method of claim 1, wherein the compression ignition of the high load mode is spark-assisted.

10. The method of claim 1, wherein the compression ignition of the high load mode is preceded by a pre-injection of hydrogen to provide a pre-injection of a lean hydrogen-air mixture below a lean flammability limit of the engine.

11. An improved hydrogen-fueled internal combustion engine, the engine having at least one cylinder, the improvements comprising:
   the at least one cylinder having a fuel injector centrally mounted at the head of the cylinder and a co-located spark plug;

a mode controller that stores a mode threshold value, the mode threshold value representing a torque of the internal combustion engine;

at least one sensor operable to determine a demanded torque of the internal combustion engine during operation of the internal combustion engine;

wherein the mode controller is further operable to compare the demanded torque to the mode threshold value;

if the demanded torque is less than the mode threshold value, to operate the internal combustion engine in a low load mode that uses spark ignition and pre-mixed combustion;

if the demanded torque is greater than the mode threshold value, to operate the internal combustion engine in a high load mode that uses compression ignition and diffusion combustion.

12. The improved internal combustion engine of claim 11, wherein the at least one sensor is an intake airflow sensor.

13. The improved internal combustion engine of claim 11, wherein the at least one sensor is a torque control sensor.

14. The improved internal combustion engine of claim 11, wherein the at least one sensor is a knock sensor.

15. The improved internal combustion engine of claim 11, wherein the at least one sensor is an in-cylinder pressure sensor.

16. The improved internal combustion engine of claim 11, wherein the fuel injector is a multi-hole injector, and the spark plug has a gap between two of the injector's spray plumes.

17. The improved internal combustion engine of claim 11, wherein the fuel injector is a single-hole injector, and the spark plug has a gap on the periphery of a plume produced by the injector.

18. A method of operating a hydrogen-fueled internal combustion engine, the engine having at least one cylinder, comprising:

determining a mode threshold value, the mode threshold value representing a torque of the internal combustion engine;

during operation of the internal combustion engine, determining a demanded torque of the internal combustion engine;

comparing the demanded torque to the mode threshold value;

if the demanded torque is less than the mode threshold value, operating the internal combustion engine in a low load mode;

wherein the low load mode uses spark-assisted compression ignition;

if the demanded torque is greater than the mode threshold value, operating the internal combustion engine in a high load mode;

wherein the high load mode uses compression ignition and diffusion combustion.

\* \* \* \* \*